Figures 1, 2:
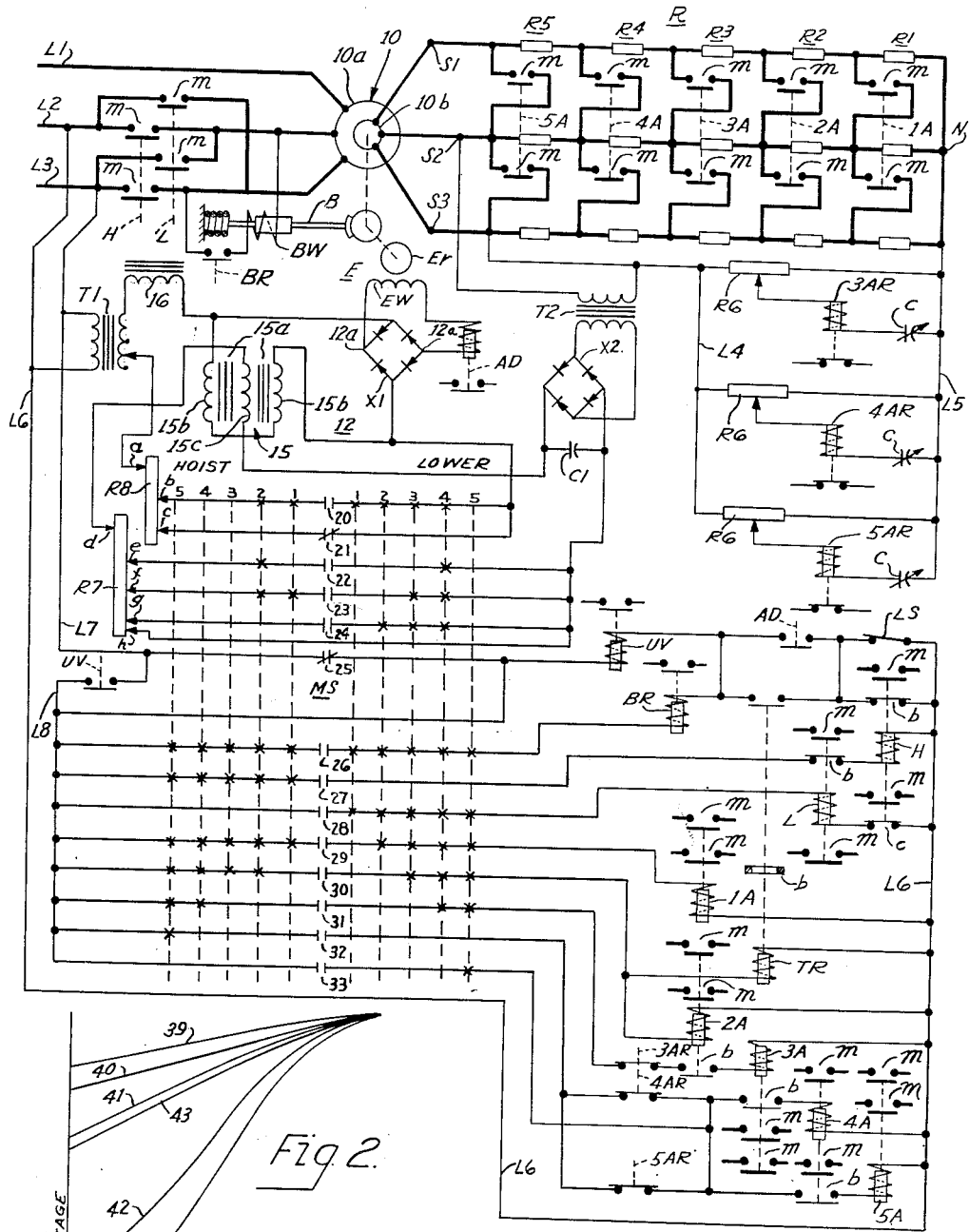

Oct. 9, 1956 — C. A. SCHURR — 2,766,415
MAGNETIC AMPLIFIER MOTOR CONTROL SYSTEM
Filed March 12, 1953

INVENTOR.
CHARLES ALLAN SCHURR
BY John H. Leonard Jr.
Harold J. Rathbun
his ATTORNEYS.

United States Patent Office 2,766,415
Patented Oct. 9, 1956

2,766,415

MAGNETIC AMPLIFIER MOTOR CONTROL SYSTEM

Charles Allan Schurr, Euclid, Ohio, assignor, by mesne assignments, to Square D Company, Detroit, Mich., a corporation of Michigan Application March 12, 1953, Serial No. 341,940

8 Claims. (Cl. 318—209)

This invention relates to a magnetic amplifying system in which a relatively large direct current output is varied inversely with respect to a relatively small alternating signal current and more particularly to such a magnetic amplifying system suitable for controlling motor drives in which an electric motor, usually a polyphase wound rotor induction motor, is coupled to an artificial load and is utilized for apparatus in which the actual load at times overhauls and drives the motor and its artificial load and in which the overhauling load must be retarded to limit its speed. A crane hoist is a common example of a motor drive of this type.

Braking generators are often used as artificial loads for polyphase wound rotor induction motors driving the hoist motion of cranes to give under-synchronous speed control during hoisting as well as during both power and overhauling lowering. When used for braking purposes, generators of the eddy current type, commonly referred to as "eddy current brakes," possess some advantages, such as simplicity and cost, over generators having external load circuits, and accordingly the hoist control system described herein is one using an eddy current brake.

The magnetic amplifying system of this invention is operative to change the excitation of the eddy current brake in a direct relation with the speed of the motor in such a manner that the torque output of the brake is correlated with the torque output of the motor to cause the speed to be substantially constant and independent of the load. The approximately constant speed while lowering results from the relatively weak excitation of the brake when light loads are being lowered with the master switch in a selected lowering speed point and from the relatively strong excitation of the brake when heavy loads are being lowered with the master switch in the same lowering speed point. The approximately constant speed while hoisting results from the relatively weak excitation of the brake when heavy loads are being hoisted with the master switch in a selected hoisting speed point and from the relatively strong excitation of the brake when light loads are being hoisted with the master switch in the same hoisting speed point. By properly correlating the range of variation of the excitation of the brake for each of several speed points with the value of motor secondary resistance for the corresponding speed point, improved speed regulation throughout the entire normal and abnormal loading range is obtained for those speed points over that obtained when the brake excitation is maintained constant.

Furthermore, an eddy current brake excited by a constant voltage selected to provide adequate torque for the safe lowering of overloads produces so much torque when light loads are being lowered that considerable motor torque must be provided to provide an adequate lowering speed for the light loads. This large motor torque results in unnecessary heating of both the motor and brake. On the other hand, the use of increased brake excitation to provide the additional brake torque required for the safe lowering of overloads and the automatic reduction of this excitation when light loads are being lowered, permits the slow lowering of heavy loads and permits the desired speeds of light loads to be obtained with a reduced value of motor torque or increased light load speeds with larger values of motor torque. The variable excitation permits the use of a smaller brake and the smaller brake, when excited at reduced excitation, permits still greater reductions in motor torque for adequate speed of light loads.

The variable excitation for the eddy current brake has been obtained from a brake exciting circuit means in which a variable unidirectional voltage derived from the secondary circuit of the hoist motor is combined with a larger substantially constant unidirectional reference voltage to obtain a resultant voltage which is applied to the brake. More specifically, in one prior system, a self-saturating magnetic amplifier is provided in the circuit means that supplies current to the winding of the eddy current brake. Means are provided for concurrently connecting the circuit means to a source of substantially constant alternating reference voltage, a biasing voltage, and to the secondary circuit of the wound rotor hoist motor. The self-saturating magnetic amplifier responds to these excitations to provide an output voltage that increases with the motor speed.

The present invention effects a material reduction in the complexity and cost of systems of the type just described by eliminating the need for a self-saturating magnetic amplifier and one of the control windings associated therewith. In the system described herein, a magnetic amplifier in the form of a simple saturable core reactor having a single control winding is connected in parallel with the alternating current side of the rectifier which supplies the eddy current brake. A reactor of fixed value is interposed between the power source and the parallel connected saturable core reactor and rectifier. An alternating voltage taken from the secondary circuit of the hoist motor is rectified and the resulting direct voltage is impressed through an adjustable resistor on the single control winding of the saturable core reactor. The effective value of the resistor is adjusted by the same master switch which controls the direction and torque output of the wound rotor motor to select the desired range of variation in the excitation of the eddy current brake.

It is an object of this invention to provide an improved alternating current control system having the foregoing advantages.

Another object is to provide, for a motor mechanically coupled to a braking generator constituting an artificial load for the motor, an improved control system which excites the generator in relation to the speed of the motor.

A further object is to provide, for a polyphase wound rotor induction motor mechanically coupled to a braking generator constituting an artificial load for the motor, an improved control system which excites the generator in relation to an electrical condition of the secondary circuit of the motor.

A further object is to provide an improved control system which correlates the characteristics of a polyphase wound rotor induction motor and an eddy current brake excited in relation to the secondary voltage of the motor.

A further object is to provide a control system which correlates the characteristics of a polyphase wound rotor induction motor and a braking generator energized by a voltage obtained from an improved circuit means supplied from the secondary circuit of the motor and including a saturable core reactor having a single control winding.

An additional object is to provide an improved control system in which control power derived from the secondary circuit of a wound rotor hoist motor at a potential that depends upon an electrical condition of the secondary circuit is amplified and impressed on an eddy current brake mechanically connected to the motor shaft.

Another object is to provide an improved speed control system for a wound rotor motor in which a voltage derived from the secondary circuit of the motor controls a saturable core reactor means in the supply circuit for a braking generator mechanically coupled to the motor.

Other objects and advantages will become apparent from the following description wherein reference is made to the drawings, in which:

Figure 1 is a wiring diagram illustrating the control system of this invention when connected to a wound rotor motor and a braking machine such as an eddy current brake; and Figure 2 is a graph showing operating characteristics of the brake exciting circuit means of Figure 1.

The control system illustrated comprises a plurality of electromagnetic contactors and relays each of which is diagrammatically shown in the wiring diagram of Figure 1. To simplify the drawing, many of the contactor and relay contacts are shown in convenient physical locations in the wiring diagram as well as in conjunction with their respective operating windings.

Referring to Figure 1, a polyphase wound rotor induction motor 10 which may be used for operating a hoist mechanism (not shown) has a primary winding 10a arranged to be supplied with power, for hoisting and lowering operations selectively, from a suitable power source represented by supply lines L1, L2, and L3, and has a secondary winding 10b provided with secondary terminals S1, S2, and S3 to which is connected a balanced Y-connected resistance bank or resistor R comprising sections R1, R2, R3, R4, and R5 and a neutral point N. The secondary winding 10b and the resistor R thus constitute a secondary circuit for the motor 10.

The motor 10 is shown as coupled to a suitable spring-applied, electromagnetically-released, friction brake B, having an operating winding BW preferably arranged to be connected across two of the primary terminals of the motor 10 upon closure of normally open contacts of an electromagnetic brake relay BR.

A suitable power consuming device or artificial load such as an eddy current brake E provided with a field winding EW has its eddy current member or rotatable armature Er coupled to the shaft of the motor 10 either directly as indicated in Figure 1 or by means of a suitable gear train (not shown). Although in the illustrated embodiment of the invention the braking machine E is shown as an eddy current brake, it will be understood that other types of generators and electric power consuming devices having suitable speed-torque characteristics may be used to obtain many of the advantages of this invention. Preferably, the torque output of the braking machine E, when it is excited at constant voltage, increases rapidly at slow speeds and either reaches substantially a maximum value at a speed less than the synchronous speed of the motor 10 or increases less rapidly at higher speeds.

Power connections for causing the motor 10 to operate in the hoisting direction are completed upon closure of a pair of normally open main contacts m of an electromagnetic contactor H, and power connections for causing the motor 10 to operate in the lowering direction are completed upon closure of a pair of normally open main contacts m of an electromagnetic contactor L. Control of the amount of the resistor R effectively inserted in the secondary circuit of the motor 10 may be provided by a plurality of electromagnetic contactors 1A, 2A, 3A, 4A, and 5A each having a pair of normally open main contacts indicated at m for selectively short circuiting the resistor sections R1, R2, R3, R4, and R5 and some having auxiliary or control circuit contacts to be described.

A plurality of suitable relays may be provided for controlling the rate of acceleration of the motor 10 and are shown as electromagnetic, speed-responsive relays 3AR, 4AR, and 5AR connected to the secondary circuit in resonant operating circuits of the type described and claimed in Leitch Patent No. 2,165,491. Since a complete description of such resonant relay-operating circuits in a hoist controller may be had from McArthur et al. Patent No. 2,325,413, only a brief description thereof is included herein.

Each of the resonant relay operating circuits comprises a suitable capacitor C, which may be adjustable as indicated, and a potentiometer resistor R6, the resistors R6 being connected in parallel with each other between a conductor L4 connected to the secondary terminal S3 and a conductor L5 which may be connected to the neutral point N. The operating windings of the relays 3AR, 4AR, and 5AR are connected in series with their respective capacitors C between the conductor L5 and an adjustable tap on their respective resistors R6. The relays 3AR, 4AR, and 5AR have respective sets of normally closed contacts which, as explained in the aforementioned Leitch patent, open concurrently upon application of power to the primary winding 10a and close in sequence at predetermined speeds as the motor 10 accelerates depending upon the capacity of the respective capacitors C and the adjustment of the taps on the respective resistors R6, closure of the relay contacts being caused by impairment of resonance of their respective relay circuits as the frequency of the secondary voltage of the motor 10 decreases during acceleration.

The winding Ew of the eddy current brake E is energized while the motor 10 is deenergized and at certain times during operation of the motor 10 by the unidirectional voltage appearing across output terminals 12a of a brake exciting circuit means 12 including an amplifying means such as a magnetic amplifier in the form of a saturable core reactor 15 having a saturable core 15a, a pair of main or impedance windings 15b, and a single control winding 15c. By a single winding is meant either one winding only or a plurality of windings in series or parallel and having but two input terminals so as to be in operative effect a single winding. Although a specific and well known form of saturable core reactor is diagrammatically illustrated, it will be understood that other forms of saturable or variable impedance devices having suitable characteristics can be used if desired.

In addition to the saturable core reactor 15, the brake exciting circuit means 12 comprises suitable transformers T1 and T2, full wave rectifiers X1 and X2, adjustable resistors R7 and R8, and an impedance device such as a reactor 16 which may be adjustable if desired. As will become apparent, the circuit means 12, when concurrently energized by a substantially constant alternating reference voltage and by a variable alternating voltage derived from the secondary circuit of the motor 10, provides a unidirectional output voltage at its terminals 12a that varies directly with the speed of the motor 10 at speeds below synchronism.

An electromagnetic relay AD which has its operating winding connected in series with the winding Ew across the terminals 12a is provided to protect against excessive lowering speeds in a manner to be described should the winding Ew inadvertently become deenergized.

When the supply lines L2 and L3 are energized, a substantially constant alternating potential is impressed across the primary winding of the transformer T1. A means to adjust the value of the voltage at the secondary of the transformer T1 is desirable and the secondary winding of the transformer T1 is provided with taps as indicated for this purpose. The rectifier X1 is supplied with alternating voltage from the secondary winding of the transformer T1 through a circuit forming part of the circuit means 12 and including the reactor 16 and the resistor R8 in series. The reactance windings 15b of the saturable core reactor 15 are connected in series with each other directly across the alternating current or input terminals of the rectifier X1, so that the resistor R8 and the reactor 16 are interposed in the circuit between the windings 15b and the transformer T1. Accordingly, a change in the reactance of the winding 15b causes a change in the voltage drop across the reactor 16 and the effective portion of the resistor R8 so that the resulting unidirectional potential appearing across the output terminals of the rectifier X1 is dependent upon the degree of saturation of the core 15a of the reactor 15. The degree of saturation of the core 15a depends upon the amount of excitation of the saturating or control winding 15c wound on the core 15d. For any given adjustment of the transformer T1 and excitation of the winding 15c, the alternating voltage at the rectifier X1 is determined by adjustment of taps a, b, and c of the resistor R8 and by selective operation of normally open contacts 20 and normally closed contacts 21 of a suitable control device such as a five-position, reversing master switch MS also having contacts 22 through 33. As will become apparent thereinafter, only the portion of the resistor R8 between its taps a and b is effective during operation of the motor 10. Preferably, this portion of the resistor R8 has a very small ohmic value relative to the impedance of the reactor 16.

The control winding 15c is arranged to be supplied with direct current from the rectifier X2 which has its alternating current input terminals connected across the secondary winding of the transformer T2 the primary winding of which is supplied from the secondary circuit of the motor 10, and as shown, is connected across the secondary terminals S2 and S3. The current in the control winding 15c may be controlled by the adjustable resistor R7 which is interposed between the right-hand output terminal of the rectifier X2 and the upper terminal of the control winding 15c. The effective value of the resistor R7 may be selected by movement of its adjustable taps d through h and by the selective operation of the master switch contacts 22, 23, and 24. For filtering purposes, a capacitor C1 may be connected across the direct current terminals of the rectifier X2.

The transformer T2, rectifier X2, capacitor C1, and resistor R7 thus constitute a control power means arranged to be connected to a circuit of the motor 10, and, when so connected, to be operative to provide control power at a potential that depends upon an electrical condition of the motor circuit. In the present instance, the electrical condition is the secondary voltage which varies inversely with the speed of the motor at speeds below synchronism.

From the foregoing it is seen that the brake exciting circuit means 12 is concurrently supplied with power at a substantially constant potential and with control power at a potential that varies inversely with the speed of the motor 10. As will become apparent hereinafter, the potential at the output terminals 12a of the brake exciting circuit means 12 is a function of these two potentials, the circuit means 12 being operative to provide amplified power at a potential that depends upon and varies inversely with the potential at the secondary terminals S2 and S3.

In the off position of the master switch MS, all of its contacts 20 through 33 are open except the contacts 21 and 25. When the master switch MS is operated in either the hoisting or lowering direction, its contacts are open except as closure thereof is indicated by the crosses in horizontal alignment with the contacts, each cross indicating that its horizontally aligned contacts are closed for the respective position of the master switch. Thus, for example, the contacts 23 are closed in the first two hoisting positions and in the third and fourth lowering positions, and are open in all other positions.

The contacts 25 are interposed in an energizing circuit for the operating winding of an undervoltage relay UV extending between conductors L6 and L7 which are connected to the supply lines L2 and L3, respectively, and the contacts 26 through 33 are interposed in similar energizing circuits for all of the contactors and for the relays UV, BR, and TR and extending between the conductor L6 and a conductor L8 which is connected to the conductor L7 through the contacts 25 or normally open contacts of the undervoltage relay UV when that relay is energized and its normally-open contacts are closed.

It will be understood that the usual disconnecting switches, overload relays, fuses, and the like, may be included in the control system of Figure 1 as is well known in the art.

Since the potential across the secondary terminals S2 and S3 is zero at synchronous speed, the ampere turns produced by the winding 15c is zero at that time. Under these conditions, the impedance of the windings 15b is a maximum and consequently the voltage at the rectifier X1 and the current flowing through the rectifier X1 to the brake winding Ew are a maximum. When the motor 10 is at standstill and its primary winding 10a is connected to the supply line L1, L2, and L3, the voltage across the secondary terminals S2 and S3 is relatively large, its actual value depending upon the amount of the resistor R effective in the secondary circuit, and the voltage at the rectifier X1 and the current in the brake winding Ew are determined by the ampere turns produced by the winding 15c. Preferably, the reactor 15 is so selected that, under these conditions, the voltage at the terminals of the rectifier X1 and the current in the winding Ew can be adjusted over a relatively wide range, the exact values of this voltage and current being dependent upon the amount of the resistor R effective in the secondary circuit and the adjustment of the resistor R7 in series with the control winding 15c.

Consequently, as the motor 10 accelerates from standstill towards its synchronous speed, the voltage impressed on the eddy current brake winding EW increases. Since the voltage at the terminals S2 and S3 decreases as the speed of the motor 10 increases, the voltage impressed on the winding EW varies directly with the speed. The variations of this voltage with speed for different values of the resistor R7 and for different values of the secondary resistor R are illustrated in Figure 2 wherein the voltage at the winding EW is plotted against the speed of the motor 10. As will be explained more in detail later, curves 39, 40, 41 and 42 of Figure 2 show the variations in voltage at the brake winding EW in the first four lowering positions of the master switch MS, respectively, and the curves 43 and 44 show the variation of this voltage in the first two hoisting positions, respectively.

In the off position of the master switch MS, the contacts 21 are closed and complete a circuit from the transformer T1 to the rectifier X1 through the reactor 16 and the resistor R8 between its taps a and c. Even though the saturable core reactor has its maximum impedance at this time because there is no current in the winding 15c, the resistor R8 and the reactor 16 preferably so limit the current that only sufficient current flows to the brake winding EW to cause pick up the relay AD. With the relay AD picked-up, the undervoltage relay UV is energized through a circuit including the contacts 25, the contacts of the relay AD and normally closed contacts LS of an overhoist limit switch. The contacts LS of the limit switch are paralleled by normally closed auxiliary contacts b of the contactor H to permit closure of the relay UV when the limit switch is open and the hoist contactor H is not energized. When the relay UV is energized, its contacts are closed and maintain the relay UV closed against opening of the contacts 25 by connecting the conductor L7 to the conductor L8.

Considering now the operation of the control system of Figure 1, in the first hoisting position of the master switch MS, the contacts 26, 27 and 29 are closed and complete the energizing circuits for the relay BR, the contactor H, and the contactor 1A, respectively, the circuit for the contactor H including normally closed auxiliary contacts b of the contactor L. The circuit for the operating winding of the relay BR is completed through the now closed contacts of the relay AD and the contacts of the limit switch LS. When these circuits are completed, the contactor H closes its main contacts m to connect the motor 10 for hoisting operations, the contactor 1A closes its main contacts m to short-circuit the resistor section R1, and the relay BR closes its contacts to complete the energizing circuit for the winding BW of the brake B which thereupon releases. Immediately after the contacts m of the contactor H close, the relays 3AR, 4AR and 5AR pick-up to open their respective contacts, and the transformer T2 supplies an alternating potential to the rectifier X2.

In the first hoisting position of the master switch MS, the contacts 20 and 23 are also closed so that the rectifier X2 supplies direct current to the winding 15c through the portion of the resistor R7 between its taps d and f and only the portion of the resistor R8 between its taps a and b is effective. Since the resistance of the resistor R8 between its taps a and b is small compared to the impedance of the reactor 16, almost all of the voltage drop in the circuit between the transformer T1 and the reactance windings 15b occurs across the reactor 16. Before the motor accelerates, a predetermined current flows in the control winding 15c. This current causes the impedance of the windings 15c to be such that considerable current is shunted from the rectifier X1. The current shunted from the rectifier X1 and flowing through the windings 15c causes a material voltage drop across the reactor 16 and the portion of the resistor R8 between the taps a and b. Accordingly, the voltage impressed on the winding EW may be as indicated at the intercept of the curve 43 and the voltage axis in Figure 2. As the motor 10 accelerates, the voltage at the terminals S2 and S3 decreases and accordingly the excitation of the control winding 15c decreases. Consequently, less current is shunted from the rectifier X1 by the windings 15b, and the voltage at the terminals 12a increases with the speed of the motor 10 as shown by the curve 43 of Figure 2.

In the second hoisting position of the master switch MS, the contacts 30 close to complete the energizing circuits for the contactor 2A and the relay TR. The contactor 2A thereupon closes its main contacts m to short circuit the additional resistor section R2 which causes the torque of the motor 10 to increase. The relay TR closes a by-pass circuit around the contacts of the relay AD for a purpose to be described. Also, in the second hoisting position, the contacts 22 of the master switch MS close to short circuit the portion of the resistor R7 between its taps e and f. Since the amount of resistance in the circuit between the rectifier X2 and the winding 15c has now been decreased, the ampere turns for any given speed of the motor 10 produced by the winding 15c are increased. This causes the voltage across the brake winding EW to be less for any given sub-synchronous speed of the motor 10 than when the master switch MS is in the first hoisting position, and may be as indicated by the curve 44 of Figure 2. The resultant torque available to hoist a load consequently increases. The voltage at the secondary terminals S2 and S3 decreased for any given speed of the motor 10 when the contactor 2A operated, resulting in a corresponding decrease in the ampere turns produced by the winding 15c, and this decrease is taken into account in selecting the position of the tap e along the resistor R7.

In the third hoisting position, the contacts 20, 22, and 23 of the master switch MS open to effect deenergization of the brake supply circuit 12. Since the eddy current brake E is now deenergized, the torque available at the motor shaft for hoisting a load increases. The relay AD is also deenergized and its contacts are open. However, the relays UV and BR remain energized because the contacts of the relay TR are closed.

In the fourth hoisting position of the master switch MS, the contacts 31 in the energizing circuit for the contactor 3A close. When the speed of the motor 10 reaches a predetermined value, the relay 3AR closes its contacts. The energizing circuit for the contactor 3A is then completed through the contacts 31, the contacts of the relay 3AR and now closed normally open auxiliary contacts b of the contactor 2A. The resultant closure of the contacts m of the contactor 3A short circuits the additional resistor section R3 and the torque of the motor 10 again increases.

Movement of the master switch MS to its last hoisting position closes the contacts 32 in the energizing circuits for the contactors 4A and 5A. When the speed of the motor 10 reaches a predetermined value, the relay 4AR closes its contacts to complete the circuit for the contactor 4A through the contacts 32, the contacts of the relay 4AR, and now closed normally open auxiliary contacts b of the contactor 3A. The resulting closure of the contacts m of the contactor 4A short circuits the additional resistor section R4 which causes the motor 10 to accelerate until a speed is reached at which the relay 5AR closes its contacts to complete the energizing circuit for the contactor 5A through the contacts 32, the contacts of the relay 5AR, and now closed normally open auxiliary contacts b of the contactor 4A. The contactor 5A thereupon responds to short circuit all of the secondary resistor R. The motor 10 now exerts its maximum hoisting torque.

Return of the master switch MS from the last hoisting position to the off position results in a switching sequence opposite to that just described. When the off position is reached, the motor 10 and the brake B are deenergized and the load is held in the elevated position by the brake B. The relay AD remains operated because of the low current circuit maintained through the contacts 21. When the master switch reached its first hoisting position, the relay TR was deenergized, but the relay TR is provided with means such as a copper sleeve b to delay the opening of its contacts so that the relay UV is not deenergized inadvertently because of a time lag in the reclosure of the contacts of the relay AD caused by a slow build up of current in the eddy current brake circuit.

In the first lowering position of the master switch MS the contacts 26 and 28 close to complete, respectively, the energizing circuits for the relay BR and for the contactor L, the latter circuit being through normally closed auxiliary contacts c of the contactor H. The contactor L thereupon responds to close its main contacts m to connect the motor 10 for lowering operations, and the relay BR responds to close its contacts causing the brake B to release. The motor 10 is now connected for lowering operations with all of the resistor R effective in the secondary circuit.

As soon as the contacts m of the contactor L close, the relays 3AR, 4AR and 5AR pick up to open their respective normally closed contacts.

Also, in the first lowering position, the contacts 20 are closed so that only the portion of the resistor R8 between the taps a and b is effective in the circuit from the transformer T1 to the reactance windings 15b, and the contacts 22, 23 and 24 are open so that all of the resistor R7 between its taps d and h is in series with the winding 15c. Consequently, the excitation provided by the winding 15c is relatively low so that the winding EW is strongly energized even at slow speeds as indicated by the curve 39 of Figure 2.

In the second lowering position of the master switch MS, the contacts 29 close to complete the energizing circuit for the contactor 1A which thereupon closes its main contacts to short circuit the resistor section R1, and the contacts 24 of the master switch MS close to short circuit the portion of the resistor R7 between its taps g and h which causes an increase in the excitation of the winding 15c so that the voltage impressed on the winding EW for any given sub-synchronous speed of the motor 10 decreases and now varies as indicated by the curve 40 of Figure 2.

In the third lowering position of the master switch MS, the contacts 30 close to complete the energizing circuit for the contactor 2A and the relay TR. The contactor 2A thereupon closes its contacts m to short circuit the additional resistor section R2 which causes the motor 10 to increase its torque, and the relay TR closes to by-pass the contacts of the relay AD. Also, in the third lowering position, the contacts 23 close to short circuit the portion of the resistor R7 between its taps f and h which causes a further increase in the excitation of the winding 15c resulting in a further reduction in the voltage across the winding EW to the values indicated by the curve 41 of Figure 2.

In the fourth lowering position of the master switch MS, the contacts 31 close to partially complete the energizing circuit for the contactor 3A through the now closed auxiliary contacts b of the contactor 2A which circuit is completed upon closure of the contacts of the relay 3AR when a predetermined speed is reached. Response of the contactor 3A causes the additional resistor section R3 to be short circuited and the motor torque consequently increases. Also, in the fourth lowering position, the contacts 22 close to leave only the portion of the resistor R7 between its taps d and e in series with the winding 15c. The voltage across the winding Ew now varies as indicated by the curve 42 of Figure 2.

It will be noted that in both the first hoisting position and in the third lowering position the portion of the resistor R7 between its taps d and f is effective in the circuit between the rectifier X2 and the control winding 15c. However, in the first hoisting position the resistor sections R2 through R5 are effective in the secondary circuit whereas in the third lowering positions only the resistor sections R3 through R5 are effective. This causes the secondary currents that flow in the third lowering position to be greater than those which flow in the first hoisting position which in turn causes the range of voltage variation at the secondary terminals S2 and S3 to be higher in the first hoisting position than in the third lowering position. This difference in voltage at the terminals S2 and S3 causes the voltage at the winding EW to vary through a slightly higher range when operating in the third lowering position than when operating in first hoisting position. Similarly, the voltage curves 42 and 44 for the fourth lowering position lower and the second hoisting position, respectively, are displaced from each other.

Movement of the master switch MS to the fifth lowering position completes the energizing circuits through the contacts 33 for the contactors 4A and 5A. The circuit for the contactor 4A is completed through the now closed auxiliary contacts b of the contactor 3A and the contacts m of the contactor 4A thereupon close to short circuit the additional resistor section R4 causing a further increase in the torque of the motor 10. The contactor 5A is energized through the now closed auxiliary contacts b of the contactor 4A and responds to short circuit all of the secondary resistor R. When the master switch MS reaches the fifth lowering position, the contacts 20 open to disconnect the winding EW from its source of energization, and the brake E no longer exerts a retarding torque. Overhauling loads are now lowered by regenerative braking alone.

Upon return of the master switch MS from any one of its lowering positions to its off position, the contactors L and 1A through 5A and the relays TR and BR are deenergized. Since the contacts of the time delay TR remain closed for a time interval after deenergization of its operating winding, the relay UV remains excited for a predetermined time interval or until the relay AD picks up.

Although in the control system as illustrated in Figure 1, adjustable voltages have been taken only from the resistor R7 in order to obtain the spread in the resultant voltages 39 through 44, it is apparent that taps on the resistor R8 could be provided instead for this purpose, or taps on both resistors could be utilized.

It is also apparent that one or more steps of unbalanced voltage braking could be provided for the motor 10 with or without assistance from the braking generator.

What is claimed is:

1. In a control system including a braking generator having a field winding, a wound rotor motor having a shaft coupled to the braking generator and having a primary winding and a secondary winding, a generator field supply circuit having input terminals and output terminals and connected at its input terminals to a source of substantially constant alternating voltage and at its output terminals to said field winding, a saturable core reactor having an impedance winding means connected across said circuit, a rectifier interposed in said circuit between said field winding and said impedance winding means, a substantially constant impedance interposed in said circuit between said source of alternating voltage and said impedance winding means, a control winding means for said saturable core reactor operative when energized with direct current to control the impedance of said impedance winding means, means interconnecting said control winding means and said secondary winding so that the direct current in said control winding means varies directly with the voltage induced in said secondary winding.

2. The control system of claim 1 characterized in that an adjustable resistor is connected to said secondary winding, adjusting means are provided for adjusting the ratio of the current in said control winding means to said induced voltage, and manual means are operable to adjust said adjustable resistor and said adjusting means concurrently.

3. An electric motor operating system comprising an electric motor, a braking device drivingly connected to said motor and having a field winding, a saturable core reactor having an impedance winding means and a control winding means, said control winding means being operative when energized with direct current to control the impedance of said impedance winding means, an impedance means, means connecting said impedance winding means and said impedance means in series with each other across a source of alternating voltage, means electrically connecting said field winding to said impedance winding means so that the current in said field winding varies directly with the voltage across said impedance winding means, control power supply means providing a unidirectional voltage which varies with the speed of said motor, and means for impressing said unidirectional voltage on said control winding means.

4. The motor operating system of claim 3 characterized in that said braking device is of the type in which the power consuming ability increases with the current in said field winding, and said control power supply means is of the type which provides a unidirectional voltage which varies inversely with the speed of said motor.

5. The motor operating system of claim 3 characterized in that said means electrically connecting said field winding means to said impedance winding means includes a rectifier for converting the alternating voltage appearing across said impedance winding means to a direct voltage at said field winding means.

6. The motor operating system of claim 3 characterized in that said impedance means is a reactor of relatively constant value.

7. The motor operating system of claim 3 characterized in that said impedance means includes a resistor.

8. The motor operating system of claim 3 characterized in that said control power supply means is connected to a circuit of said motor and the unidirectional voltage provided by said control power supply means depends upon an electrical condition of said circuit.

References Cited in the file of this patent

UNITED STATES PATENTS

| | | |
|---|---|---|
| 1,652,923 | Alexanderson | Dec. 13, 1927 |
| 1,920,618 | Zierdt | Aug. 1, 1933 |
| 2,040,684 | Boyajian | May 12, 1936 |
| 2,085,061 | Aggers | June 29, 1937 |
| 2,267,395 | Chambers | Dec. 23, 1941 |
| 2,477,988 | Krabbe | Aug. 2, 1949 |
| 2,569,456 | Cushing et al. | Oct. 2, 1951 |
| 2,581,292 | Rathbun | Jan. 1, 1952 |
| 2,581,315 | Widdows et al. | Jan. 1, 1952 |
| 2,581,596 | Nims | Jan. 8, 1952 |
| 2,697,813 | Stone | Dec. 21, 1954 |